US011119689B2

(12) United States Patent
Kawamura et al.

(10) Patent No.: US 11,119,689 B2
(45) Date of Patent: Sep. 14, 2021

(54) ACCELERATED DATA REMOVAL IN HIERARCHICAL STORAGE ENVIRONMENTS

(71) Applicant: International Business Machines Corporation, Armonk, NY (US)

(72) Inventors: Kousei Kawamura, Tokyo (JP); Koichi Masuda, Tokyo (JP); Takahiro Tsuda, Tokyo (JP); Sosuke Matsui, Tokyo (JP); Takeshi Nohta, Tsukuba (JP); Shinsuke Mitsuma, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 259 days.

(21) Appl. No.: 15/979,927

(22) Filed: May 15, 2018

(65) Prior Publication Data
US 2019/0354307 A1 Nov. 21, 2019

(51) Int. Cl.
*G06F 12/00* (2006.01)
*G06F 3/06* (2006.01)

(52) U.S. Cl.
CPC .......... *G06F 3/0652* (2013.01); *G06F 3/0608* (2013.01); *G06F 3/0664* (2013.01); *G06F 3/0682* (2013.01)

(58) Field of Classification Search
CPC ...... G06F 3/0608; G06F 3/061; G06F 3/0652; G06F 3/0664; G06F 3/0682; G06F 3/0686
See application file for complete search history.

(56) References Cited

U.S. PATENT DOCUMENTS

| 6,789,161 | B1 | 9/2004 | Blendermann |
| 7,249,218 | B2 | 7/2007 | Gibble |
| 8,402,226 | B1* | 3/2013 | Faibish ............... G06F 12/0804 711/143 |
| 9,372,801 | B2 | 6/2016 | Beeston |
| 2005/0055512 | A1* | 3/2005 | Kishi .................. G06F 12/0804 711/135 |

(Continued)

OTHER PUBLICATIONS

Kishi, G.T., "The IBM Virtual Tape Server: Making Tape Controllers More Autonomic", IBM J. Res. & Dev. vol. 47 No. 4 Jul. 2003, pp. 459-469.

*Primary Examiner* — Gurtej Bansal
(74) *Attorney, Agent, or Firm* — Aaron N. Pontikos

(57) ABSTRACT

A computer-implemented method for maintaining a storage volume in a virtual tape system includes writing one or more logical volumes associated with a first category and one or more logical volumes associated with a second category to a primary storage in a virtual tape system. The computer-implemented method further includes performing a first automatic removal process in order to free up space on the primary storage, wherein the first automatic removal process removes logical volumes associated with the first category in priority to logical volumes associated with the second category. The computer-implemented method further includes performing a second automatic removal process, wherein the second automatic removal process dynamically alters the priority of the first automatic removal process such that one or more virtual volumes associated with the second category are removed in priority to one or more virtual volumes associated with the first category.

16 Claims, 5 Drawing Sheets

(56) References Cited

U.S. PATENT DOCUMENTS

| | | | |
|---|---|---|---|
| 2005/0080992 A1* | 4/2005 | Massey | G06F 3/0605 |
| | | | 711/114 |
| 2009/0222627 A1* | 9/2009 | Reid | G06F 12/0804 |
| | | | 711/135 |
| 2010/0293328 A1 | 11/2010 | Kishi | |
| 2012/0284544 A1* | 11/2012 | Xian | G06F 3/061 |
| | | | 713/320 |
| 2015/0331806 A1* | 11/2015 | Mondal | G06F 12/0246 |
| | | | 711/103 |
| 2016/0259573 A1 | 9/2016 | Brettell | |

\* cited by examiner

ACCELERATED DATA REMOVAL IN HIERARCHICAL STORAGE ENVIRONMENTS

BACKGROUND

The present invention relates generally to the field of hierarchical storage management, and more particularly to hierarchical storage management of virtual tape systems.

Hierarchical storage management is a data storage process that moves data within a tiered storage environment. In a tiered storage environment, at least two types of data storage media are delineated by differences in attributes, such as price, performance, capacity, and function. Accordingly, whether data is stored in one tier or another is defined by the requirements of the data to be stored.

The use of hierarchical storage management allows an enterprise to reduce the cost of data storage, as well as simplify the retrieval of data from slower storage media. Typically, hierarchical storage management is used for deep archival storage of data that is required to be maintained for a prolonged period at low cost. The need for hierarchical storage management stems from the fact that high-speed storage devices (e.g., solid state drive arrays) are more expensive (per byte stored) than slower speed storage devices (e.g., hard disk drives, optical discs, and magnetic tape drives). With hierarchical storage management, infrequently used data files stored on high-speed storage media are migrated to slower speed storage media if the data files are not used (i.e., accessed) for a certain period. When access to the data files is required, data is copied from the slower speed storage to faster disk drives. In effect, hierarchical storage management turns a fast disk drive into a cache for the slower mass storage devices.

A virtual tape system ("VTS") is a cloud or virtual data storage and backup system that uses magnetic-tape-based consolidated storage infrastructure to store and retrieve data. A VTS functions like a typical magnetic tape storage system but is enabled and integrated with cloud storage and virtualization techniques. Typically, a VTS is implemented to achieve enhanced storage management performance while reducing disk cartridge waste. A VTS eliminates data retrieval latency by storing an instance of frequently used files in disk caches to provide faster access to the data. Moreover, a VTS uses a virtual tape library ("VTL") built over storage virtualization to reduce the amount of tape disk required.

SUMMARY

According to one embodiment of the present invention, a computer-implemented method for maintaining a storage volume in a virtual tape system is disclosed. The computer-implemented method includes writing one or more logical volumes associated with a first category and one or more logical volumes associated with a second category to the primary storage in the virtual tape system. The computer-implemented method further includes performing a first automatic removal process in order to free up space on the primary storage, wherein the first automatic removal process removes logical volumes associated with the first category in priority to logical volumes associated with the second category. The computer-implemented method further includes performing a second automatic removal process, wherein the second automatic removal process dynamically alters the priority of the first automatic removal process such that one or more virtual volumes associated with the second category are removed in priority to one or more virtual volumes associated with the first category.

According to another embodiment of the present invention, a computer program product for maintaining a storage volume in a virtual tape system is disclosed. The computer program product includes one or more computer readable storage media and program instructions stored on the one or more computer readable storage media. The program instructions include instructions to write one or more logical volumes associated with a first category and one or more logical volumes associated with a second category to the primary storage in the virtual tape system. The program instructions further include instructions to perform a first automatic removal process in order to free up space on the primary storage, wherein the first automatic removal process removes logical volumes associated with the first category in priority to logical volumes associated with the second category. The program instructions further include instructions to perform a second automatic removal process, wherein the second automatic removal process dynamically alters the priority of the first automatic removal process such that one or more virtual volumes associated with the second category are removed in priority to one or more virtual volumes associated with the first category.

According to another embodiment of the present invention, a computer system for maintaining a storage volume in a virtual tape system is disclosed. The computer system includes one or more computer system includes one or more computer processors, one or more computer readable storage media, and program instructions stored on the computer readable storage media for execution by at least one of the one or more processors. The program instructions include instructions to write one or more logical volumes associated with a first category and one or more logical volumes associated with a second category to the primary storage in the virtual tape system. The program instructions further include instructions to perform a first automatic removal process in order to free up space on the primary storage, wherein the first automatic removal process removes logical volumes associated with the first category in priority to logical volumes associated with the second category. The program instructions further include instructions to perform a second automatic removal process, wherein the second automatic removal process dynamically alters the priority of the first automatic removal process such that one or more virtual volumes associated with the second category are removed in priority to one or more virtual volumes associated with the first category.

DETAILED DESCRIPTION

Generally, a VTS includes a system (e.g., a special storage device, group of devices, etc.) and software, firmware, etc., that has hierarchical storage management functionality, whereby data is migrated between tiered storage. For example, a VTS migrates data between a primary, high-speed storage media (e.g., hard disk drives and/or solid-state disk drives) and a secondary, slower speed storage media (e.g., magnetic tape drive). The primary storage media (typically the faster storage device) is also known as a tape volume cache ("TVC").

A virtual tape library ("VTL") is a data storage virtualization technology that utilizes a storage component (usually hard disk storage) as tape libraries or tape drives for use with existing backup software. Virtualizing the disk storage as tape allows integration of VTLs with existing backup software and existing backup and recovery processes and policies. In essence, a VTL writes data in such a way that the data appears to be stored entirely on tape cartridges when the data is actually located on faster storage devices, such as solid-state drives and hard disk drives. A VTL can be thought of as a disk array that mimics tape. To servers, the VTL appears to be a tape library and the data backup software that writes to it and manages it as if it were tape. However, because a VTL is actually disk-based, it is much faster than tape to read and write. The benefits of such virtualization include storage consolidation and faster data restore processes. Furthermore, by backing up data to disks instead of tapes, VTL often increases performance of both backup and recovery operations.

A VTL stores data on disk drives as logical volumes (i.e., "virtual volumes"). In some instances, logical volumes are classified and managed according to categories of data. Such categories may include but are not limited to a "scratch" category and a "private" category. A scratch category is a category for registering logical volumes that are allowed to be overwritten. Thus, when writing new data to a VTL, the writer of the data performs a scratch mount. Upon receiving a scratch mount instruction, the VTL selects one of the volumes in the scratch category and performs the mount. In other words, the VTL selects a volume that can be overwritten.

The private category is a category for registering logical volumes that are not allowed to be overwritten and thus, are to be retained. Whether or not a logical volume is designated at a "scratch" or a "private" category can be designated by a user or system administrator. Additionally, a user or system administrator may change the designation, such that a logical volume with a "scratch" category can be moved to a "private" category and vice versa. Accordingly, a logical volume designated in the "private" category that is no longer needed can ultimately be moved from the "private" category to the "scratch" category.

Figure 1A:
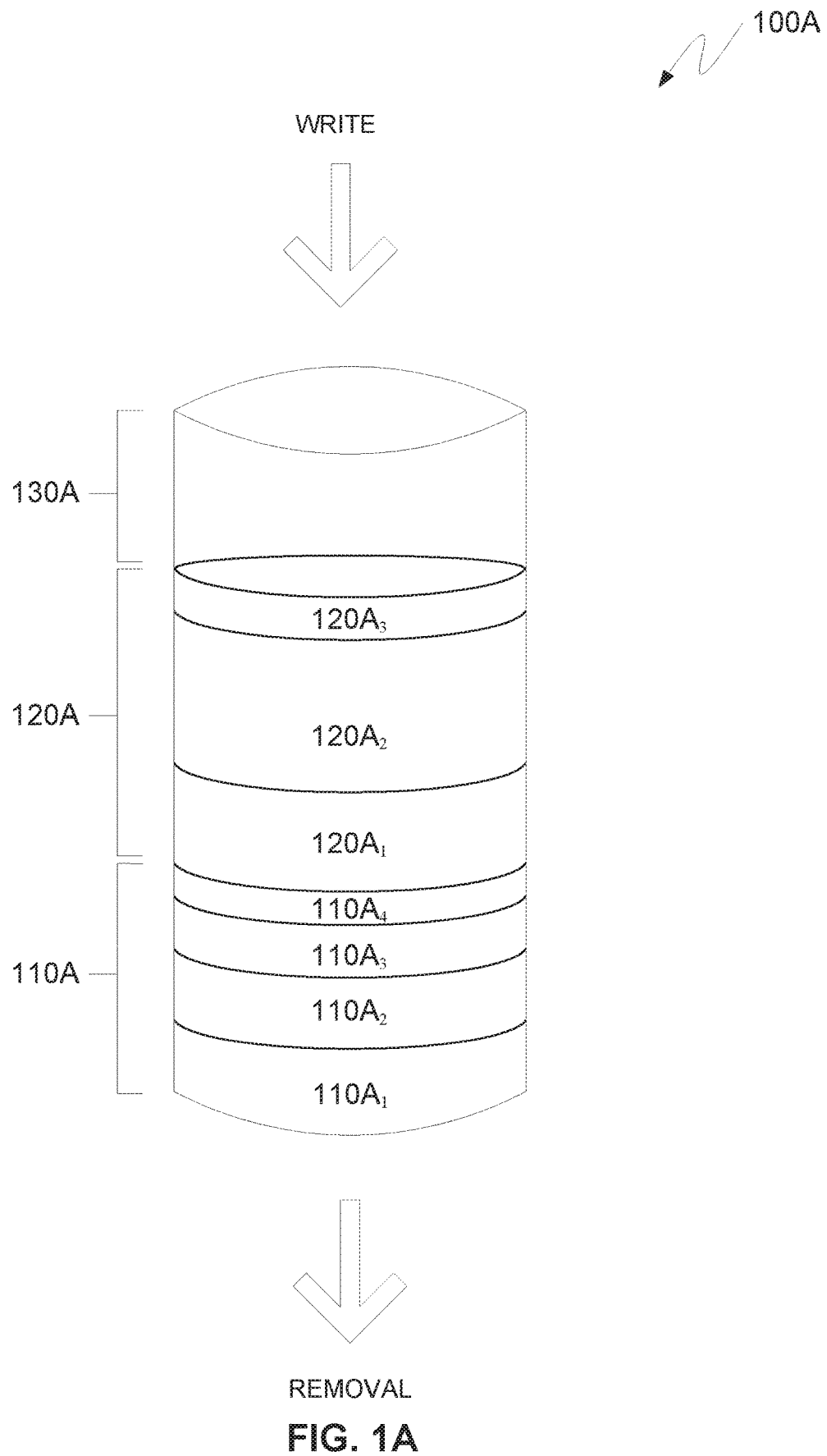
FIG. 1A is an exemplary disk cache in a storage array of a virtual tape library in accordance with at least one embodiment of the invention.

Turning now to the Figures, and particularly to FIG. 1A, an exemplary disk cache 100A of a disk in a storage array of a VTL can be seen. As depicted in FIG. 1A, disk cache 100A includes a first category 110A of stored data ("scratch" logical volumes), a second category 120A of stored data ("private" logical volumes), and free space 130A. First category 110A of stored data includes scratch data $110A_1$, scratch data $110A_2$, scratch data $110A_3$, and scratch data $110A_4$. Second category 120A of stored data includes private data $120A_1$, private data $121A_2$, and private data $122A_3$. As data is written to disk cache 100A, free space 130A decreases.

Once free space 130A on disk cache 100A is equal to and/or below a predetermined threshold value, the VTL is triggered to perform logical volume auto-removal processing in an attempt to increase free space 130A on disk cache 100A. According to typical logical volume auto-removal processes, logical volumes in the scratch category are first removed in descending order of capacity (i.e., size) so that free space can be provided faster. Thus, the order of removal (in descending order of capacity) of logical volumes in the scratch category of disk cache 100A would be scratch data $110A_1$, scratch data $110A_2$, scratch data $110A_3$, and lastly scratch data $110A_4$. If all of the logical volumes in the scratch category have been removed, then logical volumes in the private category are removed in descending order of elapsed time of prior access.

Figure 1B:
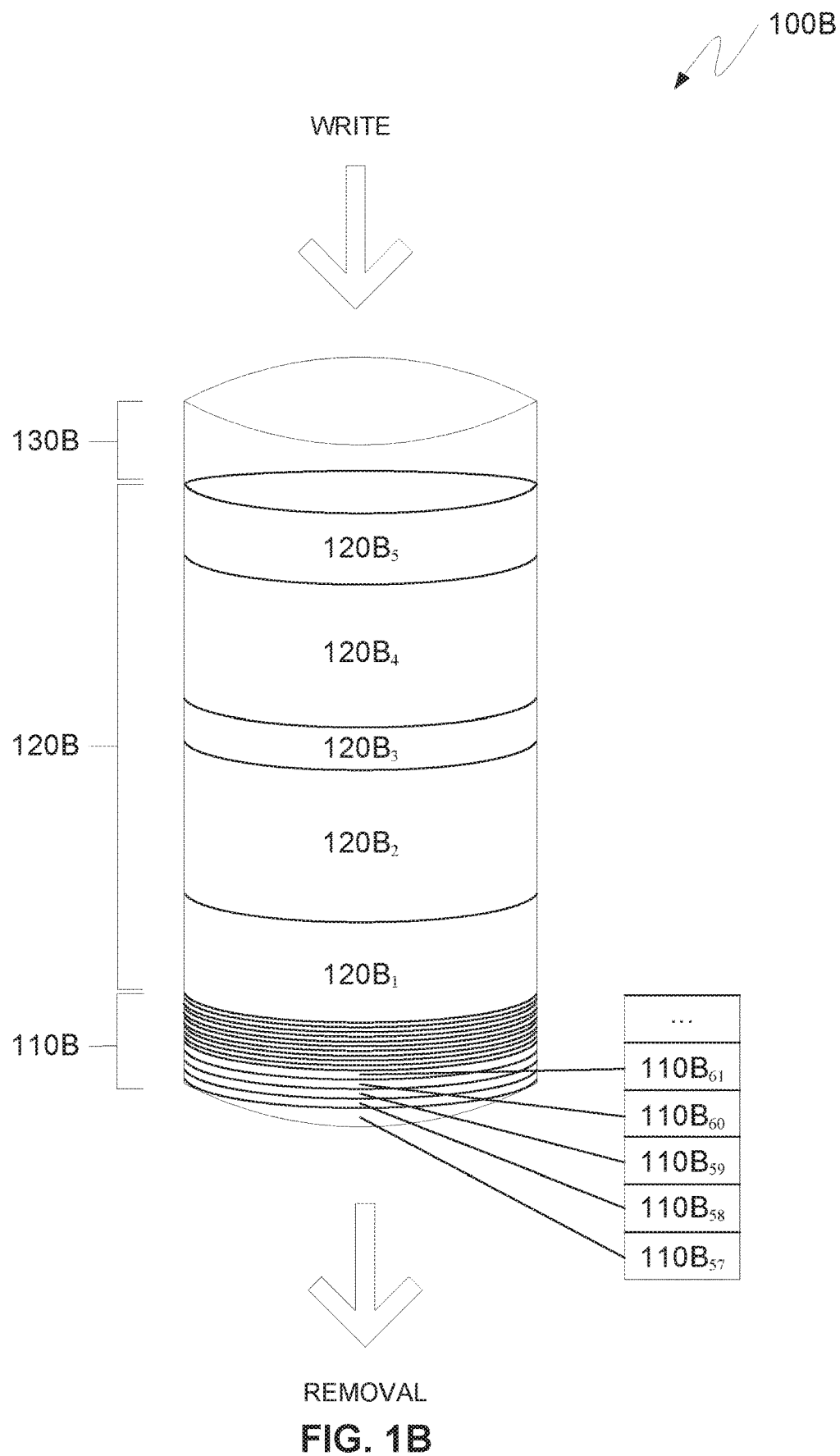
FIG. 1B is an exemplary disk cache in a storage array of a virtual tape library after undergoing a first logical volume auto-removal process over a period of time in accordance with at least one embodiment of the invention.

FIG. 1B illustrates an exemplary disk cache 100B of a disk in a storage array of a VTL after undergoing a first type of logical volume auto-removal process over a period of time. It should be noted that disk cache 100A is identical to disk cache 100B. However, a portion of the data written to disk cache 100B is different than the data written to disk cache 100A as a result of logical volume auto-removal processing.

As depicted in FIG. 1B, disk cache 100B includes first category 110B of stored data (logical volume scratch data), a second category 120B of stored data (logical volume private data), and free space 130B. Although scratch data $110A_1$, scratch data $110A_2$, scratch data $110A_3$, and lastly scratch data $110A_4$ have been removed from disk cache 100A (depicted in FIG. 1A), and thus are no longer stored on disk cache 100B, as scratch data is removed from disk cache 100A during the logical volume auto-removal process, new scratch data, as well as new private data is also being written to disk cache 100A. Accordingly, first category 110B of stored data on disk cache 100B now includes scratch data $110B_{57}$, $110B_{58}$, and $110B_{59}$ . . . $110B_n$. It should be noted that initially, as the larger capacity logical volumes in the scratch category are removed, free space on the disk cache increases. This is evinced by the fact that after undergoing logical volume auto-removal processing, second category 120B of stored data of disk cache 100B now includes private data $120B_1$, private data $120B_2$, private data $120B_3$, private data $120B_4$, and private data $120B_5$, wherein private data $120B_1$, private data $120B_2$, private data $120B_3$ is the same data as private data $120A_1$, private data $120A_2$, private data $120A_3$ of disk cache 100A (depicted in FIG. 1A).

However, with increasing demand for faster, more powerful and more efficient ways to store information, optimization of storage technologies remains a key challenge in VTSs. Embodiments of the present invention recognize several deficiencies with the first type of logical volume auto-removal process. Although logical volumes in the scratch category are removed in descending order of logical volume capacity (and thereby providing cache free disk space more quickly), the time required for removal of logical volumes is fixed, regardless of a logical volume's capacity.

As illustrated by FIGS. 1A and 1B, as logical volumes in the scratch category are removed in descending order of capacity (i.e., the larger capacity logical volumes are removed first), logical volumes with a smaller capacity remain on the disk cache. This stems from the fact that new, larger capacity logical volumes will continue to be mounted to the disk cache during the logical volume auto-removal process. As evinced by the transformation of the initial data stored on disk cache 100A of FIG. 1A at the start of the logical volume auto-removal process and the final data stored on disk cache 100B after a period of time, the number of logical volumes in the scratch category on disk cache 100B has actually increased.

Embodiments of the present invention recognize that since the time required for removal of a logical volume is fixed, regardless of the logical volume's capacity, the amount of cache free disk space that can be freed up decreases as the size of the logical volume being removed decreases. As the number of small capacity logical volumes loaded on the disk cache increases, the amount of cache free disk space created by the removal of such small capacity logical volumes becomes negligible. Accordingly, the amount of cache free disk space that can be freed up per unit of time (i.e., the rate of removal) through typical logical volume removal processes ultimately decreases over time.

If the rate of removal continues to be slower than the rate at which data is written, the disk will eventually run out of cache free disk space. The decrease in the rate of removal due to an increase in small capacity logical volumes in the scratch category becomes increasingly problematic if the disk runs out of cache free disk space. At this point, data writing to the VTS can no longer be performed and consequently, host jobs are suspended.

Embodiments of the present invention provide one or more of: features, characteristics, operations and/or advantages to the first type of logical volume auto-removal process and generally encompass (i) an improvement to at least the field of hierarchical storage management and (ii) a technical solution to one or more of challenges in the field of hierarchical storage management. Such challenges in the field of hierarchical storage management may include, but are not limited to, one or more of: (i) limitations in the amount of cache free disk space that can be freed up per unit of time, (ii) limitations in the removal of logical volumes in a private category, (iii) limitations in the data removal rate from a disk cache, and (iv) shifting respective priority of data removal in various logical volumes. Certain embodiments of the present invention both recognize and address other challenges that are not specifically addressed herein but are readily understood to be encompassed by the technical solutions described herein.

Embodiments of the present invention may increase the data removal rate from a disk cache (and thereby increase the amount of cache free disk space that can be freed up per unit of time) by removing logical volumes in the private category. Embodiments of the present invention increase the data removal rate from a disk cache by dynamically (i.e., automatically) shifting priority of data removal from logical volumes in the "scratch category" to logical volumes in the "private category" during a logical volume auto-removal process. In an embodiment, in response to shifting the priority of data removal, logical volumes in the private category are removed in descending order of elapsed time of prior access. In an embodiment, in response to shifting the priority of data removal, logical volumes in the private category are removed in descending order of capacity.

In embodiments of the invention, the priority of data removal is dynamically shifted based, at least in part, on one or more of the following factors: (i) a rate at which data is being written to the disk cache, (ii) a rate of removal (bytes per unit time) of data from the scratch category, and (iii) an amount of free space on the disk cache. In an embodiment, priority of data removal is dynamically shifted from logical volumes in the scratch category to logical volumes in the private category in response to determining that a rate of removal of logical volumes from the scratch category is below and/or equal to a predetermined threshold value. In a further embodiment, priority of data removal is dynamically shifted from logical volumes in the scratch category to logical volumes in the private category in response to determining that an amount of free space on a disk cache falls below a predetermined threshold value. In yet another embodiment, priority of data removal is dynamically shifted from logical volumes in the scratch category to logical volumes in the private category in response to determining that both the rate of removal of logical volumes in the scratch category and the amount of free space on a disk cache has fallen below a predetermined threshold value.

Similarly, embodiments of the present invention provide for dynamically shifting priority of data removal from logical volumes in the private category to logical volumes in the scratch category in response determining that an amount of cache free disk space on the TVC is above the predetermined threshold value.

In some embodiments of the invention, an increase in the data removal rate from a disk cache is accomplished without entirely shifting priority of data removal from logical volumes in the "scratch category" to logical volumes in the "private category." In these embodiments, priority of data removal from logical volumes in the "scratch category" is changed such that priority of data removal is alternated between logical volumes in the scratch category and logical volumes in the private category. In an embodiment, priority of data removal is restored entirely to the removal of logical volumes in the "scratch category" in response to determining that an amount of cache free disk space on the TVC exceeds a predetermined threshold value. In a further embodiment, priority of data removal is restored entirely to the removal of logical volumes in the "scratch category" in response to determining that a data removal rate exceeds a rate at which data is written to a disk cache.

Embodiments of the present invention recognize that although removing logical volumes in the private category may result in a decrease in the performance (due to cache misses) of host systems, the removal of logical volumes in the private category only occurs for a brief period of time (removal of even a single "private" logical volume will likely free up a large amount of space on the disk cache). Moreover, embodiments of the present invention generate a large amount of free space quickly when the amount of free space on a disk cache becomes scare, thereby averting a worst-case scenario where the disk cache becomes completely full. At this point, read/write operations cannot be performed, and application operations are suspended. Thus, embodiments of the present invention provide a technical solution that generates a net gain in overall performance for the computing system; i.e., the overall amount of computing resources that are consumed over time is decreased when compared to alternative solutions. Such computing resources may include but are not limited to central processor usage, volume of storage, network capacity, and the like. Those having skill in the art will recognize that embodiments of the present invention may reduce the strain, i.e. resource consumption, experienced by one or both of hierarchical storage systems as well as hierarchical storage managers when compared to alternative solutions.

Figure 2:
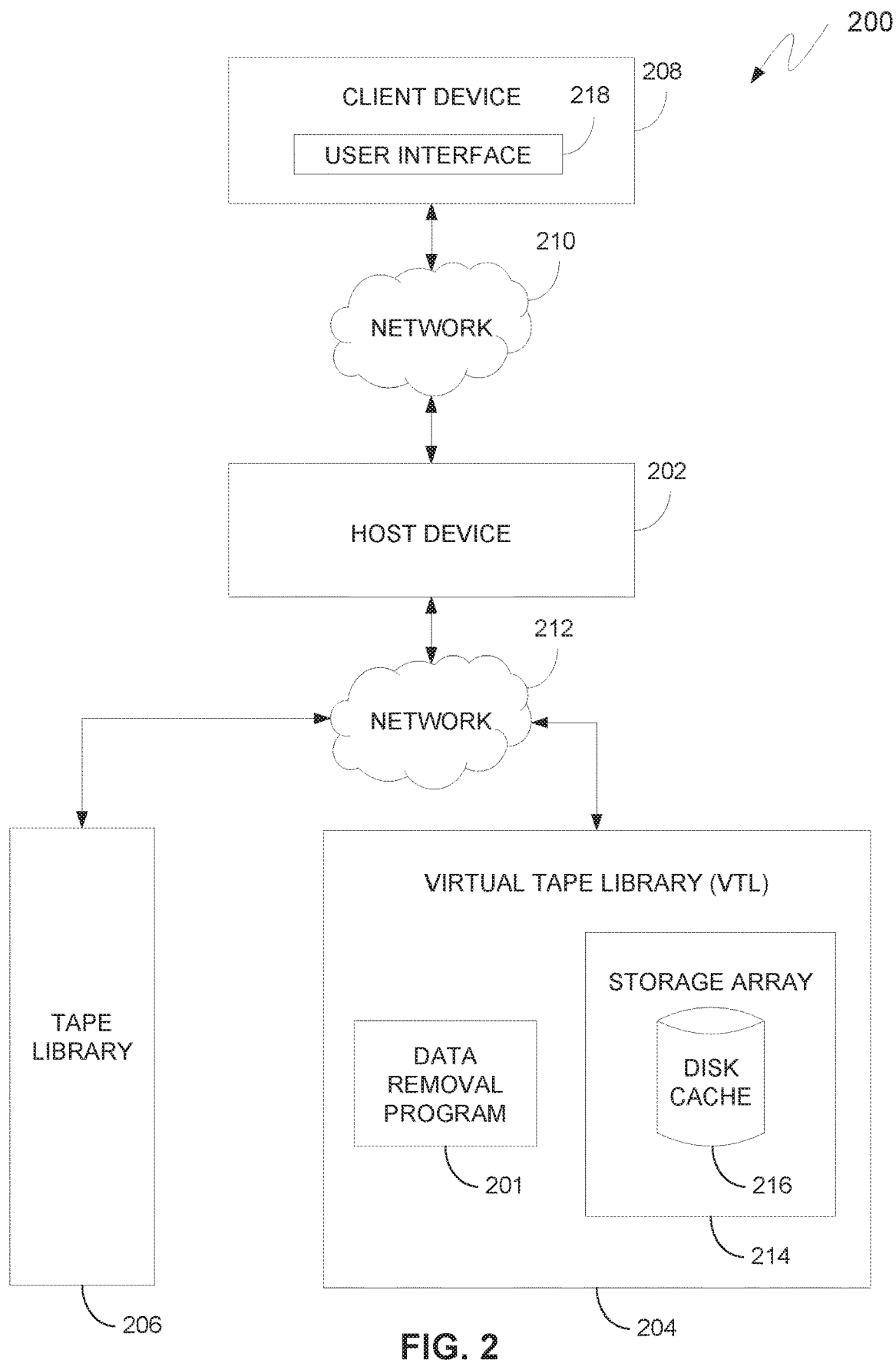
FIG. 2 is a functional block diagram of a network computing environment, generally designated 200, suitable for operation of a data removal program 201 in accordance with at least one embodiment of the invention.

Referring now to various embodiments of the invention in more detail, FIG. 2 is a functional block diagram of a network computing environment, generally designated 200, suitable for operation of a data removal program 201 in accordance with at least one embodiment of the invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 200 includes host device 202, virtual tape library 204, tape library 206, and client device 208 interconnected over network 210 and network 212. In embodiments of the invention, network 210 can be a telecommunications network, a local area network (LAN), a wide area network (WAN), such as the Internet, or a combination of the three, and can include wired, wireless, or fiber optic connections. In embodiments of the invention, network 212 is a storage area network ("SAN"). Network 212 provides block-level network access to storage, such as virtual tape library 204 and tape library 206. Network 210 and network 212 may include one or more wired and/or wireless networks that are capable of receiving and transmitting data, voice, and/or video signals, including multimedia signals that include voice, data, and video information. In general, network 210 and network 212 may be any combination of connections and protocols that will support communications between client device 208, host device 202, virtual tape library 204, tape library 206, and other computing devices (not shown) within network computing environment 200.

In various embodiments of the invention, each of host device 202 and virtual tape library 204 are computing devices that can be a standalone device, a management server, a web server, a mobile device, or any other electronic device or computing system capable of receiving, sending, and processing data. In other embodiments, host device 202 and virtual tape library 204 represent a server computing system utilizing multiple computers as a server system, such as in a cloud computing environment. In an embodiment, host device 202 and virtual tape library 204 represent a computing system utilizing clustered computers and components (e.g. database server computers, application server computers, web server computers, etc.) that act as a single pool of seamless resources when accessed within network computing environment 200. In general, host device 202 and virtual tape library 204 represent any programmable electronic device or combination of programmable electronic devices capable of executing machine readable program instructions and communicating with client device 208 and tape library 206 within network computing environment 200 via a network, such as network 210 and network 212.

Virtual tape library 204 is a data storage system that includes a primary storage that acts as a cache for a secondary storage and virtualization software that presents a storage component (e.g., hard disk storage) as tape libraries or tape drives. Virtualizing disk storage as tape allows integration of virtual tape library 204 with existing backup software and existing backup and recovery processes and policies. For example, virtual tape library 204 may be an IBM TS7720 Virtualization Engine (TS7720 VE™) or an IBM 7740 Virtualization Engine (TS7740™). While reference is made to IBM-specific hardware and/or software components, it should be understood that aspects of the present invention may be applied equally to other virtual tape library technologies. In embodiments of the invention, virtual tape library 204 includes storage array 214 (i.e., disk array). For example, storage array 214 is a RAID (Redundant Array of Independent Disks) based storage system. In some embodiments, storage array 214 is composed of spinning hard disk drives ("HDDs"). In other embodiments, storage array 214 is composed of solid-state disk drives. Each disk in storage array 214 includes a disk cache, such as disk cache 216.

In various embodiments of the invention, virtual tape library 204 receives write operations for data initially directed to be stored on a tape drive, such as a tape drive of tape library 206. However, rather than directly writing the data to a tape drive of tape library 206, virtual tape library 204 writes (i.e., "saves" or "stores") the data as a logical volume (i.e., virtual volume) on disk cache 216 of storage array 214. The data may remain on disk cache 216 until removal of the data is required, at which point, the data is written to a tape drive of tape library 206. For example, data is removed from a disk cache and written to a tape drive based on an amount of free space on the disk cache falling below and/or equaling a predetermined threshold value.

In various embodiments of the invention, virtual tape library 204 receives read requests. Upon receiving a read request, virtual tape library 204 determines whether the data is stored on a disk cache of storage array 214. If the requested data is stored as a logical volume on a disk cache of storage array 214, the data is read from the disk cache. However, if the requested data is stored on a tape drive of tape library 206, virtual tape library 204 loads the data from a tape cartridge of tape library 206 to a disk cache of storage array 214, such that the data is read from the disk cache.

Virtual tape library 204 includes data removal program 201 communicatively coupled to network 210 and network 212. Although data removal program 201 is depicted in FIG. 2 as being integrated with virtual tape library 204, in alternative embodiments, data removal program 201 is remotely located from virtual tape library 204. For example, data removal program 201 can be integrated with host device 202. Virtual tape library may include internal and external hardware components, as depicted and described in further detail with respect to FIG. 4.

Tape library 206 is an automated tape storage device that includes a plurality of tape drives for writing to and reading from tape media, such as single-reel or two-reel magnetic tape cartridges. For example, tape library 206 may be an IBM TS3400™ Tape Library or an IBM TS3500™ Tape Library. While reference is made to IBM-specific hardware and/or software components, it should be understood that aspects of the present invention may be applied equally to other tape library technologies. In embodiments of the invention, tape library 206 includes a plurality of tape media stored in banks or groups of storage slots. For example, tape media may include, but is not limited to magnetic tape cartridges, magnetic tape cassettes, and optical tape cartridges. Tape library 206 further includes one or more tape drives, a plurality of slots to hold tape cartridges, a barcode reader to identify tape cartridges and an automated method (e.g., a robot) for loading tapes.

Client device 208 allows a user to access an application running on host device 202 and/or data removal program 201 via a network, such as network 210 and network 212. Client device 208 may be a laptop computer, tablet computer, netbook computer, personal computer (PC), a desktop computer, a personal digital assistant (PDA), a smart phone, or any programmable electronic device capable of receiving, sending, and processing data. In general, client device 208 represents any programmable electronic device or combination of programmable electronic devices capable of executing machine readable program instructions and communicating with host device 202, virtual tape library 204, tape library 206, and other computing devices (not shown)

within computing environment 200 via a network, such as network 210 and network 212.

Client device 208 includes user interface 218. User interface 218 provides an interface between client device 208, host device 202, virtual tape library 204, and tape library 206. In some embodiments, user interface 218 may be a graphical user interface (GUI) or a web user interface (WUI) and can display text, documents, web browser windows, user options, application interfaces, and instructions for operation, and includes the information (such a graphic, text, and sound) that a program presents to a user and the control sequences the user employs to control the program. In other embodiments, user interface 218 may also be mobile application software that provides an interface between client device 208, host device 202, virtual tape library 204, and tape library 206.

Figure 3:
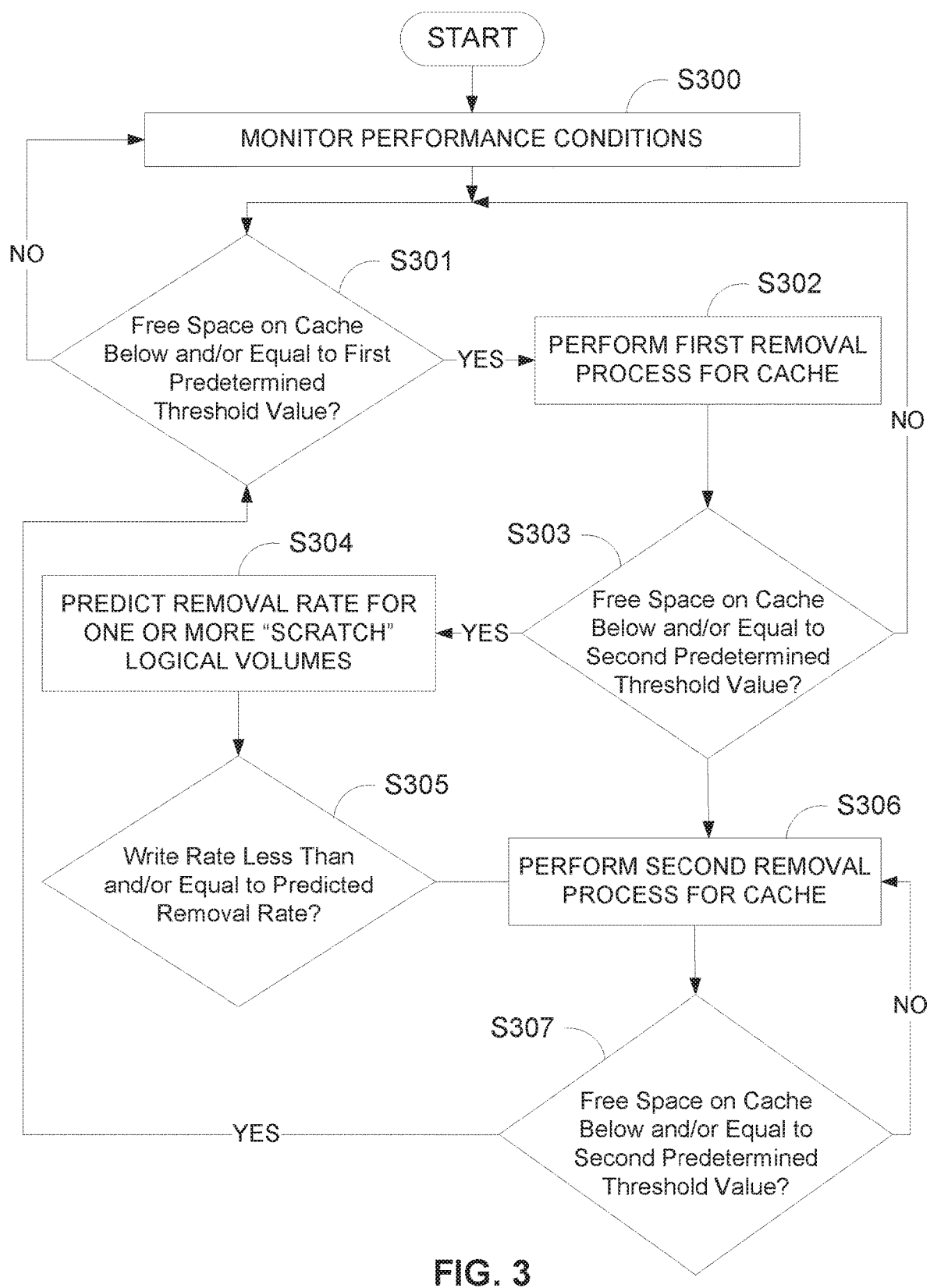
FIG. 3 is a flow chart diagram depicting operational steps for a data removal program 201 in accordance with at least one embodiment of the invention.

FIG. 3 is a flow chart diagram depicting operational steps for data removal program 201 in accordance with at least one embodiment of the invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S300, data removal program 201 monitors one or more performance conditions of a disk cache, such as disk cache 216 of a storage array, such as storage array 214. In some embodiments, monitoring a performance condition includes determining whether a performance condition falls below a predetermined threshold value. In other embodiments, monitoring a performance condition includes determining whether a performance condition exceeds a predetermined threshold value.

In embodiments of the invention, monitoring a performance condition includes determining an amount of free space (i.e., bytes) on disk cache 216 of storage array 214. The amount of free space is relative to the size of the disk cache, which typically ranges from 128 MB in standard disks to 1 GB in solid state disks.

In embodiments of the invention, monitoring a performance condition includes determining a removal rate of logical volumes from disk cache 216. In an embodiment, the removal rate of logical volumes is relative to the number of logical volumes that can be removed per unit of time (e.g., 5 logical volumes per second or 250 logical volumes per minute). In an embodiment, the removal rate of logical volumes is relative to an amount of data that can be removed per unit of time (e.g., 50 MB per second or 2,500 MB per minute).

In embodiments of the invention, monitoring a performance condition includes determining a rate at which data is written (i.e., write speed) to disk cache 216. In some embodiments, the write speed is relative to the amount of data being written to a disk cache per unit of time (e.g., 150 MB per second). In other embodiments, the write speed is relative to the number of logical volumes being written to a disk cache per unit of time (e.g., 3 logical volumes per second). In an embodiment, the write speed is relative to a number of "private" logical volumes being written to a disk cache per unit of time. In an embodiment, the write speed is relative to a number of "scratch" logical volumes being written to a disk cache per unit of time. In an embodiment, the write speed is relative to a proportion of the number of "private" logical volumes and the number of "scratch" logical volumes being written to a disk cache per unit of time.

At decision step S301, data removal program 201 determines whether an amount of free space (i.e., storage space) on disk cache 216 is below and/or equal to a first predetermined threshold value (e.g., 25% free space). If an amount of free space on disk cache 216 is above the first predetermined threshold value, data removal program 101 returns to step S300 (decision step "NO" branch). If the amount of free space on disk cache 216 is below and/or equal to the first predetermined threshold value, data removal program 201 proceeds to step S302 (decision step "YES" branch).

At step S302, data removal program 201 performs a first automatic removal process for disk cache 216. Under the first automatic removal process, data removal program 201 removes logical volumes in the scratch category in descending order of capacity (i.e., size). If all of the logical volumes in the scratch category are removed, data removal program 201 removes logical volumes in the private category in descending order of elapsed time of prior access. For example, a "private" logical volume accessed 20 minutes ago would be removed before a "private" logical volume accessed only 5 minutes ago.

At decision step S303, data removal program 201 determines whether the amount of free space (i.e., storage space) on disk cache 216 is below and/or equal to a second predetermined threshold value (e.g., 15% free space). It should be noted that the first threshold value in decision step S301 and the second threshold value in decision step S303 may be any predetermined numerical value, so long as the first threshold value is greater than the second threshold value. For example, the first threshold value corresponds to 20% free space on disk cache 216 and the second threshold value corresponds to 10% free space on disk cache 216.

In embodiments of the invention, decision step S303 is invoked during the first automatic removal process of step S302. For example, the amount of data being written to the disk cache 216 of storage array 214 may exceed the rate of removal of data in accordance with the first automatic removal process. Thus, if the amount of data being written to disk cache 216 exceeds the amount data being removed from disk cache 216, the amount of free space on disk cache 216 can continue to decrease even though the first automatic removal process is occurring.

If the amount of free space on disk cache 216 is above the second predetermined threshold value, data removal program 201 returns to step S301 (decision step "NO" branch). If the amount of free space on the disk cache is below and/or equal to the second predetermined threshold value, data removal program 201 proceeds to step S304 (decision step "YES" branch).

At step S304, data removal program 201 predicts a removal rate per unit of time (e.g., bytes of data per second) for one or more "scratch" logical volumes stored on disk cache 216 of storage array 214. In some embodiments, a first predicated removal rate is determined for the largest capacity "scratch" logical volume in accordance with the first automatic removal process ("scratch" logical volumes are removed in descending order of capacity). In these embodiments, the first predicated removal rate is based, at least in part, on: (i) a number of logical volumes that can be removed per unit of time and (ii) a capacity of the next logical volume slotted for removal.

In other embodiments, a second predicted removal rate is determined for two or more "scratch" logical volumes in accordance with the first automatic removal process ("scratch" logical volumes are removed in descending order of capacity). Thus, if the predicted removal rate is determined for three "scratch" logical volumes, the first logical volume would have the largest capacity, followed by the second and third logical volumes, respectively. In these embodiments, the second predicted removal rate is based, at least in part, on: (i) a number of logical volumes that can be removed per unit of time and (ii) an average capacity of two or more logical volumes slotted for removal.

In embodiments of the invention, whether data removal program 201 utilizes the first predicted removal rate or the second predicted removal rate is based, at least in part, on a length of time since the first automatic removal process was invoked. This is based on the assumption that the length of time that data has been removed from a disk cache will dictate a degree of similarity between those "scratch" logical volumes that remain on the disk cache. As the length of time increases, the degree of similarity in capacity size between the remaining "scratch" logical volumes stored on the data cache increases. This is based on the fact that data removal program 201 will continue to remove "scratch" logical volumes in descending order of capacity. Thus, after undergoing the first automatic removal process for a longer period of time, the "scratch" logical volumes that have a larger capacity will already have been removed, leaving the "scratch" logical volumes that have a smaller capacity on disk cache 216.

On the other hand, as the length of time decreases, the degree of similarity in capacity size between the remaining "scratch" logical volumes stored on disk cache 216 decreases. This is based on the fact that data removal program 201 will continue to remove "scratch" logical volumes in descending order of capacity. Thus, after undergoing the first automatic removal process for a shorter period of time, a mixture of "scratch" logical volumes with various capacities are likely to remain on disk cache 216.

In any of these embodiments, data removal program 201 analyzes historical automatic removal processes to determine a degree of similarity in capacity size of remaining "scratch" logical volumes stored on disk cache 216. For example, data removal program 201 compares the length of time since the first automated removal process commenced to a previous automatic process invoked for a similar length of time to determine the degree of similarity between "scratch" logical volumes.

At decision step S305, data removal program 201 determines whether the rate at which data is being written to disk cache 216 is less than or equal to a predicted removal rate per unit time. In some embodiments, the determination is based on the first predicted removal rate. In other embodiments, the determination is based on the second predicted removal rate. If the rate at which data is being written to disk cache 216 is less than or equal to a predicated removal rate, data removal program 201 returns to step S301 (decision step "YES" branch). If the rate at which data is being written to disk cache 216 is greater than a predicated removal rate, data removal program 201 proceeds to step S306.

At step S306, data removal program 201 performs a second automatic removal process. Under the second automatic removal process, data removal program 201 dynamically changes the priority of data removal from "scratch" logical volumes in accordance with the first automatic removal process to "private" logical volumes. In an embodiment, data removal program 201 removes logical volumes in the "private" category in descending order of capacity (i.e., size). In an embodiment, data removal program 201 removes logical volumes in the "private category" in descending order of elapsed time of prior access. In an embodiment, data removal program 201 alternates between removing logical volumes in descending order of capacity and logical volumes in descending order of elapsed time of prior access.

In some embodiments, removal of logical volumes in the "private" category in accordance with the second automatic removal process is based, at least in part, on whether a "private" logical volume stored on a disk cache virtual tape library 204 has been replicated on a disk cache of a second, distinct virtual tape library. It should be noted that cache misses may occur due to the removal of "private" logical volumes from the disk cache. Accordingly, if a cache miss occurs, the speed at which a "private" logical volume can be re-written to disk cache 216 of virtual tape library 204 is crucial to the performance of host device 102. Since a logical volume can be obtained from another remote virtual tape library faster than from a tape library, such as tape library 206, data removal program 201 may remove a "private" logical volume that is duplicated on another virtual tape library prior to removing a "private" logical volume that has not been duplicated on another virtual tape library.

At decision step S307, data removal program 201 determines whether the amount of free space on disk cache 216 is below and/or equal to the second predetermined threshold value. In some embodiments, data removal program 201 determines the amount of free space on disk cache 216 after each "private" logical volume is removed in accordance with the first predicted removal rate of the second automatic removal process. In other embodiments, data removal program 201 determines the amount of free space on disk cache 216 after two or more "private" logical volumes are removed in accordance with the second predicted removal rate of the second automatic removal process. If the amount of free space on disk cache 216 is above the second predetermined threshold level (decision step "NO" branch), data removal program 201 returns to decision step S301. If the amount of free space on disk cache 216 is below and/or equal to the second predetermined threshold level, data removal program 201 returns to step S306.

Figure 4:
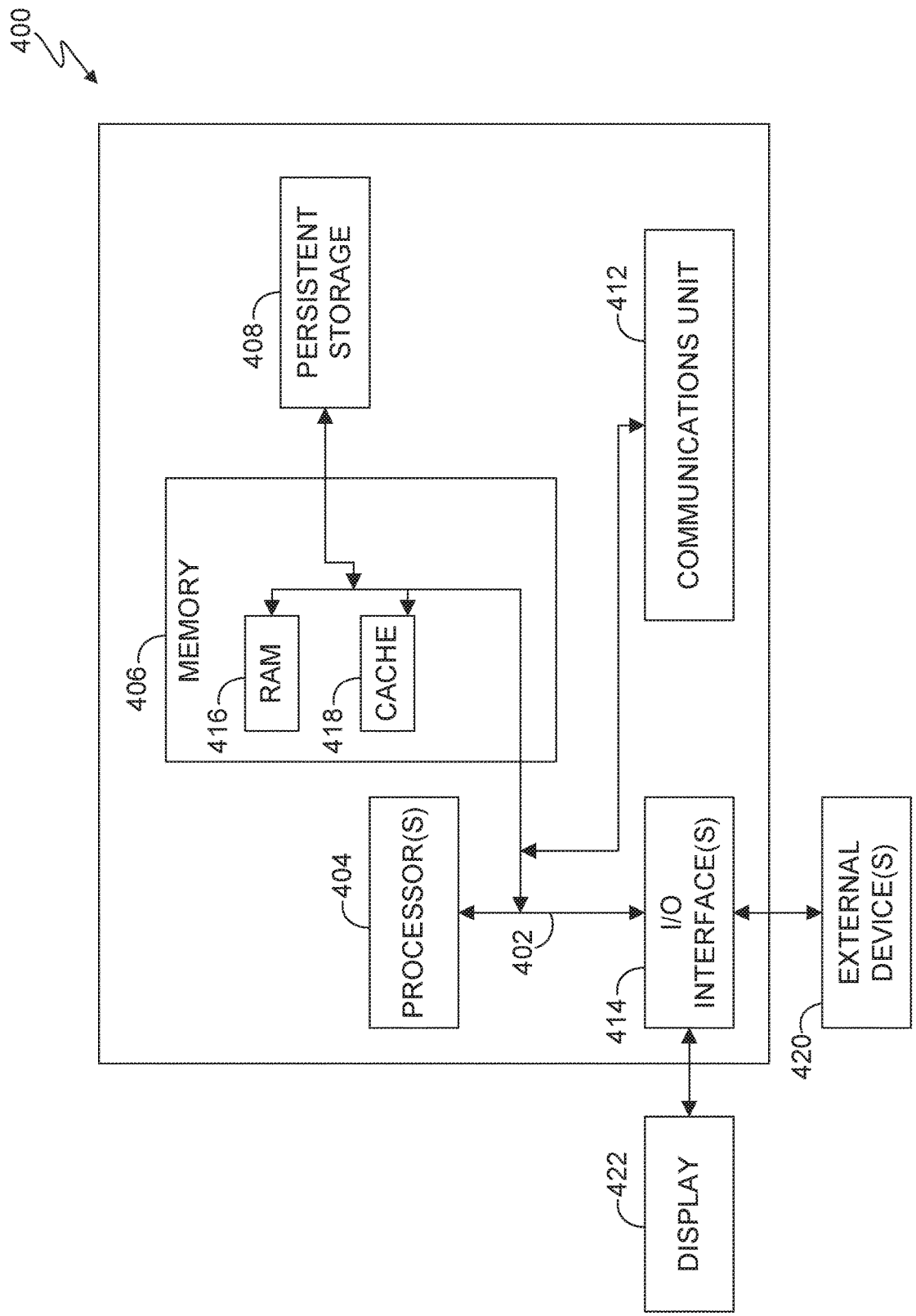
FIG. 4 is a block diagram depicting components of a computer, generally designated 400, suitable for executing data removal program 201 in accordance with at least one embodiment of the invention.

FIG. 4 is a block diagram depicting components of a computer 400 suitable for executing data removal program 201 in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interface(s) 414, a display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processor(s) 404 (e.g., microprocessors, communications processors, and network processors), the memory 406, the external device(s) 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for data removal program 201 be stored in the persistent storage 408, or more generally, any computer readable storage media, for execution by one or more of the respective computer processor(s) 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allow for input and output of data with other devices that may operate in conjunction with the computer 400. For example, the I/O interface(s) 414 may provide a connection to the external device(s) 420, which may be as a keyboard, keypad, a touch screen, or other suitable input devices. External device(s) 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for maintaining a storage volume in a virtual tape system, the computer-implemented method comprising:
    removing logical volumes that can be overwritten in priority to logical volumes that cannot be overwritten from a primary storage of the virtual tape system; and
    switching from removing logical volumes that can be overwritten in priority to logical volumes that cannot be overwritten to removing logical volumes that cannot be overwritten in priority to logical volumes that can be overwritten based, at least in part, on:
        an amount of free space on the primary storage being less than or equal to a second predetermined threshold.

2. The computer-implemented method of claim 1, wherein the removing logical volumes that can be overwritten in priority to logical volumes that cannot be overwritten comprises:
    removing logical volumes that can be overwritten in descending order of capacity; and
    removing, in response to removing all of the logical volumes that can be overwritten, logical volumes that cannot be overwritten in descending order of prior access.

3. The computer-implemented method of claim 1, wherein the second predetermined threshold is less than the first predetermined threshold.

4. The computer-implemented method of claim 1, wherein removing logical volumes that cannot be overwritten in priority to logical volumes that can be overwritten comprises removing logical volumes that cannot be overwritten in descending order of capacity.

5. The computer-implemented method of claim 1, wherein removing logical volumes that cannot be overwritten in priority to logical volumes that can be overwritten comprises removing logical volumes that cannot be overwritten in descending order of capacity.

6. The computer-implemented method of claim 1, wherein removing logical volumes that cannot be overwritten in priority to logical volumes that can be overwritten comprises removing logical volumes that cannot be overwritten in descending order of elapsed time of prior access.

7. The computer-implemented method of claim 1, wherein removing logical volumes that cannot be overwritten in priority to logical volumes that can be overwritten comprises alternating between removing logical volumes that cannot be overwritten in descending order of capacity and logical volumes that cannot be overwritten in descending order of elapsed time of prior access.

8. The computer-implemented method of claim 1, wherein selecting a logical volume that cannot be overwritten for removal is based, at least in part, on whether the logical volume that cannot be overwritten is replicated on a second virtual tape library.

9. The computer-implemented method of claim 1, wherein:
    (i) the primary storage in the virtual tape system is a disk cache of a first virtual tape library and (ii) a secondary storage device in the virtual tape system is a tape drive of a tape library.

10. The computer-implemented method of claim 9, wherein the primary storage acts as a cache for the secondary storage in the virtual tape system.

11. The computer-implemented method of claim 1, wherein switching from removing logical volumes that can be overwritten in priority to logical volumes that cannot be overwritten to removing logical volumes that cannot be overwritten in priority to logical volumes that can be overwritten if further based, at least in part, on:
    a rate at which data is being written to the primary storage being greater than or equal to a predicted removal rate of subsequent logical volumes that can be overwritten from the primary storage.

12. The computer-implemented method of claim 11, wherein the predicted removal rate of data for subsequent logical volumes that can be overwritten from the primary storage is further based, at least in part, on:

determining a first predicted removal rate based, at least in part, on: (i) a rate of removal of subsequent logical volumes that can be overwritten and (ii) a capacity of the largest subsequent logical volume that can be overwritten slotted for removal; and determining a second predicted removal rate based, at least in part, on: (i) a rate of removal of subsequent logical volumes that can be overwritten and (ii) an average capacity of two or more subsequent logical volumes that can be overwritten slotted for removal.

13. A computer program product for maintaining a storage volume in a virtual tape system, the computer program product comprising one or more computer readable storage media and program instructions stored on the one or more computer readable storage media, the program instructions including instructions to:

remove logical volumes that can be overwritten in priority to logical volumes that cannot be overwritten from a primary storage of the virtual tape system; and switch from removing logical volumes that can be overwritten in priority to logical volumes that cannot be overwritten to removing logical volumes that cannot be overwritten in priority to logical volumes that can be overwritten based, at least in part, on:

an amount of free space on the primary storage being less than or equal to a second predetermined threshold.

14. The computer program product of claim 13, wherein: (i) the primary storage in the virtual tape system is a disk cache of a first virtual tape library and (ii) a secondary storage device in the virtual tape system is a tape drive of a tape library.

15. The computer program product of claim 13, wherein the primary storage acts as a cache for the secondary storage in the virtual tape system.

16. A computer system for accelerated data removal for maintaining a storage volume in a virtual tape system, the computer system comprising:

one or more computer processors;

one or more computer readable storage media;

computer program instructions;

the computer program instructions being stored on the one or more computer readable storage media for execution by the one or more computer processors; and the computer program instructions including instructions to:

remove logical volumes that can be overwritten in priority to logical volumes that cannot be overwritten from a primary storage of the virtual tape system; and switch from removing logical volumes that can be overwritten in priority to logical volumes that cannot be overwritten to removing logical volumes that cannot be overwritten in priority to logical volumes that can be overwritten based, at least in part, on:

an amount of free space on the primary storage being less than or equal to a second predetermined threshold.

* * * * *